ZACHARIAH B. SIMS,
IMPROVED COTTON PICKER & CLEANER.

No. 116764. Patented Jul. 4 1871.

Witnesses:
Parker H. Sweet, Jr.
T. J. Peyton

Inventor:
Z. B. Sims
by his Attorney
James L. Norris.
Washington. D.C.

UNITED STATES PATENT OFFICE.

ZACHARIAH B. SIMS, OF BONHAM, TEXAS.

IMPROVEMENT IN COTTON-CLEANERS.

Specification forming part of Letters Patent No. 116,764, dated July 4, 1871.

*To all whom it may concern:*

Be it known that I, ZACHARIAH B. SIMS, of Bonham, county of Fannin and State of Texas, have invented a new and useful Improvement in Cotton-Pickers and Cleaners; and I do hereby declare the following to be a clear and exact description of the nature thereof, sufficient to enable others skilled in the art to which my invention appertains to fully understand and use the same, reference being had to the accompanying drawing making part of this specification, in which—

Figure 1:
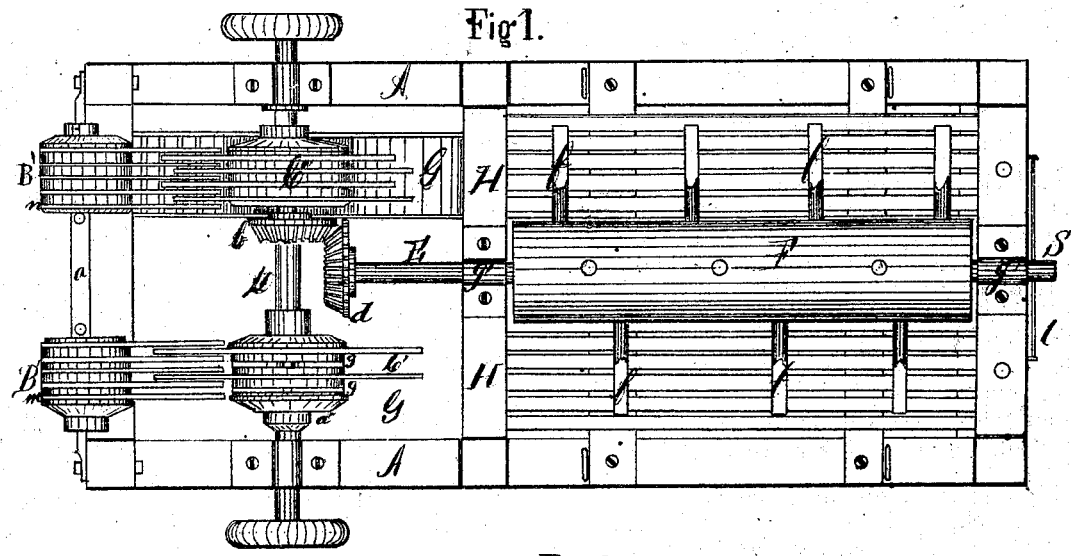
Figure 2:
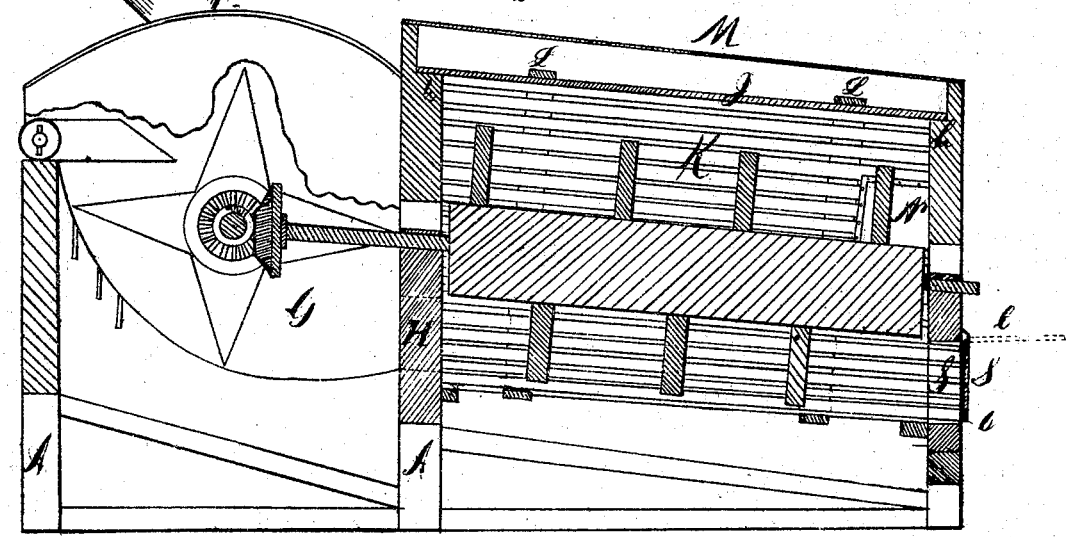
Figure 3:
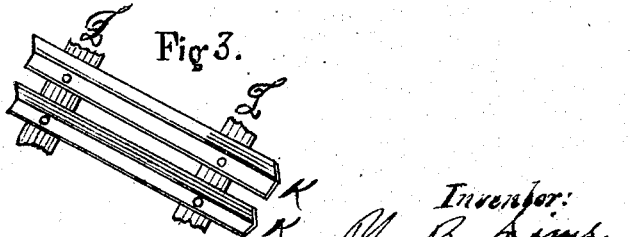

Figure 1 is a top-plan view of my improved cotton-picker and cleaner, the cover and hoppers being removed. Fig. 2 is a longitudinal sectional side view of the same with the cover and hopper in place, while Fig. 3 is a detached view of the flanged bars or strips of metal or wood.

This present invention relates to picking and cleaning cotton before it is ginned—that is, to separate or clean from the cotton all sticks, hulls, &c., which are mingled with the same after it is gathered from the field, preparatory to ginning for baling the same for the use of the market; and, to this end, it is designed as an improvement upon the patent granted to me by the United States, August 31, 1869, No. 94,352.

It is the general custom, in picking cotton in the field, to carefully remove the same from the bolls and then convey it to the gin-house. By this method field-work is frequently prevented, owing to inclement weather and various other causes; and to overcome this objection, and to preserve the cotton in a dry state or condition, I pull or break off the branches of the cotton-stalk, which generally contain from two to twenty bolls of cotton each; or I strip the bolls off the branches and remove them to the gin-house, where it is intended the picker should operate. When the weather permits, and the cotton is in a dry state, the machine, owing to its lightness, can easily be transported to any part of the field convenient to the mass of material desired to be cleaned, and, after the cotton has passed through the machine, the branches, &c., being separated from the cotton, the same is conveyed into a proper building ready for ginning and baling. This picker and cleaner breaks up the bolls and branches, which, together with such other foreign material, pass or escape through openings below the breakers and through the openings produced in the concentric cylinder, while the cotton unginned is automatically removed. Thus it is evident that not only much time and labor are saved, but that the outstanding crop can be secured in much less time by the breaking off of the branches containing the bolls than if picked from the bolls as usual. The essential features of my present invention consist as follows: In providing the bottom of the curved way, below the revolving shaft carrying the teeth, with a series of metal or wooden bars for the passage of all filth foreign to the cotton; in providing the concentric cylinder which surrounds the revolving shaft with metallic or wooden bars or strips, in such a manner that an opening or space is formed through which branches and other dirt have a free exit; and, finally, it consists of the combination of certain parts, all of which will hereinafter more fully be set forth.

In the accompanying drawing like letters of reference indicate corresponding parts in each feature.

A A is the frame of the machine, and is preferably constructed so it will be upon an incline from the front to the rear end, so as to facilitate the escape of the cotton. B B are hoppers or feed-troughs, designed for the introduction of the branches containing the bolls. These hoppers are preferably made separate, so that each set of teeth will have its own hopper, the sides of which fit closely against the sides of the incline way or chutes, hereinafter mentioned. The hopper, of course, can be made in one piece, with a division in the center, so that each set of teeth will have its own separate and independent hopper or feed-trough. The hopper may be made so that each of the breakers can be fed from the same receptacle at the same time; but it is preferable that the said hopper be provided with a division-plate about its center, so that each or the breakers may have its separate feed-trough. B B are two sets of breakers, each of which is composed of a series of teeth rigidly fastened upon the shaft C arranged upon the frame A, one side of said teeth having its bearing upon a metallic plate, $a$. C' C'' are breakers mounted upon the driving-shaft D, the teeth of which are so attached as to be removed when desired. These breakers or teeth C' C'' are, in each set, so attached to the revolving shaft D that they stand at right angles, or nearly so, to each other, and are adjusted and held in place by the nuts $a'$ $a'$ on the shaft D, or by keys. Between the breakers or teeth in each set is arranged, on the shaft D, a thin piece of wood or metal, $g$ $g$, by which means each breaker or tooth is separated in such a manner that they will never strike the fixed breakers. Similar pieces of metal or wood, *m*, are likewise arranged between the fixed breakers. Both sets can be secured to the revolving shaft D, so that the points will be in a straight line with each other; or they may be attached so that the said points will be out of a straight line. The revolving shaft D is provided at each end with a band-pulley, and has secured upon it a bevel-wheel, *b*, which gears or meshes with a large or small bevel-wheel, *d*, upon the cleaner-shaft, hereinafter mentioned. E is the cleaner-shaft, which extends through the wooden shaft F, which is provided with a series of arms, *f f*, upon its periphery, arranged in a screw-form, the points of which are preferably flattened somewhat at their outer ends. The shafts E and F may be formed of metal and in one piece, if desired, and the teeth fastened upon or cast with the same. The revolving shaft E has its bearing in suitable metal boxes *g g* attached to the frame A. G is a curved way or chute arranged below the breakers, its bottom part being provided with a series of bars of metal or wood, which extends across and forms an open space for the passage of some of the sticks or filth down between the bars, while such as do not pass between the said bars enter into the cylinder *j* through the opening H, where they are separated from the cotton, having their exit between the bars K K. J is a concentric cylinder, divided at or about its center into two parts, so that the top may be removed when desired. This cylinder is formed by means of flanged metal bars, K K, or strips of wood may be used, which are secured upon a curved bar, *h h*, at about an equal distance apart, so as to form or leave a space between each, in order to produce a free exit for the broken branches, sticks, dirt, &c. L L are strips which surround the cylinder and pass through openings formed in the bars K K, and riveted to the same in order to brace and hold the same in their respective positions. S' is an opening in the rear of the frame, above the lower side of the bars K K, for the escape of the unginned cotton, and above said opening is a slide or hinged door, *l*. It will be seen that the axis of the cylinder is inclined, to facilitate the escape of the cotton. M is the cover, which consists of metal or cloth, and is designed to cover the cylinder J, which prevents dust, &c., from flying about and injuring the cotton which has been cleaned. N is an opening in either side of the cover, which is also intended for the escape of the unginned cotton. When both the revolving breakers are in use I design to use both the openings N and S, though I prefer to use the opening N in all cases. If a metal cover is used, it is fastened to the top part of the cylinder, its sides being inclined outward and provided with a series of openings, in which is fastened a cloth extending to the ground to prevent dust, &c., rising.

I wish it distinctly to be understood that I do not confine myself to the use of two revolving sets of breakers or teeth in this machine, as I intend in some cases to use but one set in connection with the other parts constituting the machine proper.

When the single and independent hoppers shown in Fig. 2 are used, their top edges may be strengthened by uniting the same together by bolts or hooks.

It is intended that the part of the cleaner lying under the cylinder should be placed over an opening made in the floor of the gin-house, for the escape of dirt; but in field operations it is not necessary.

The operation is substantially as follows: The branches or strips containing the cotton-bolls, and such bolls as are broken off, are placed in the hopper or hoppers; the branches and outer coverings of the cotton in the bolls are broken to pieces by the breakers, and part of the filth passes down through the openings in the bottom of the inclined way, while such as is mingled together with the cotton passes into the cylinder through the opening S in the frame. The arms of the rotating shaft clean the cotton, the dirt and particles of the branches and outer covering of the bolls passing out between the flanged bars or strips of wood, and such as tend to rise strike against the cover and descend to the floor and pass through the opening in the floor of the gin-house, while the inclined position of the cylinder, together with its spirally-arranged teeth or arms, causes the unginned cotton to pass through either of the openings N and S, or through both.

Any desired power may be employed to run the machine.

Having thus described my invention, what I claim, and desire to secure by Letters Patent, is—

1. The rotary breaker C', stationary breaker B', shaft D, curved chute G formed of a series of bars not contiguous to each other, in combination with the opening H, cylinder J, and shaft E bearing the cleaner-shaft F, substantially as and for the purpose set forth.

2. The rotary breakers C' and C", arranged upon each side of the bevel-wheels *b* and *d* of the revolving shaft D, in combination with the fixed cutters B B' on the stationary shaft C, arranged and operating substantially as described, for the purpose set forth.

3. The inclined way or chute provided with the flanged or straight bars K K, in combination with the breakers B and C', and cleaner-shaft F, substantially as described.

4. The cylinder provided with the flanged bars K K, in combination with the cover provided with the opening N.

5. The cylinder J, composed of a series of separate flanged bars, K, and provided with one or more openings, as described, in combination with the gear-shaft E, cleaner-shaft F, bevel-wheels *b d*, and breakers C' B'.

To the above I have signed my name this 21st day of April, 1871.

Z. B. SIMS.

Witnesses:
W. J. PEYTON,
JAMES L. NORRIS.